US006709615B2

(12) United States Patent
Hay

(10) Patent No.: US 6,709,615 B2
(45) Date of Patent: Mar. 23, 2004

(54) METHOD OF MANUFACTURING A COMB FOR WINDING COILS OF A DISK WOUND TRANSFORMER

(75) Inventor: Noah David Hay, Wingate, NC (US)

(73) Assignee: Square D Company, Palatine, IL (US)

( * ) Notice: Subject to any disclaimer, the term of this patent is extended or adjusted under 35 U.S.C. 154(b) by 340 days.

(21) Appl. No.: 09/805,965

(22) Filed: Mar. 14, 2001

(65) Prior Publication Data

US 2002/0130749 A1 Sep. 19, 2002

(51) Int. Cl.[7] ......................... B29C 53/06; H01F 27/30; H01F 27/32

(52) U.S. Cl. ....................... 264/138; 264/146; 264/153; 264/272.11; 264/295; 264/339; 132/122; 132/262; 336/185; 336/206; 336/207

(58) Field of Search ................................ 264/138, 295, 264/334, 146, 153, 272.11; 132/122, 262; 336/185, 206, 207

(56) References Cited

U.S. PATENT DOCUMENTS 2,194,338 A * 3/1940 Vienneau ..................... 29/605
2,435,093 A * 1/1948 Mitschrich ............... 242/444.5
2,723,933 A * 11/1955 Isenberg ..................... 156/189
3,189,681 A * 6/1965 Feather .................... 174/121 R
3,238,480 A * 3/1966 Killoran .................... 336/84 R
3,495,327 A * 2/1970 Eisler .......................... 29/609
4,024,486 A * 5/1977 Klappert ..................... 336/210
4,517,540 A * 5/1985 McDougal .................. 336/205
4,959,630 A * 9/1990 Yerman et al. ............... 336/83
5,293,524 A * 3/1994 Mookerjee et al. ......... 335/216
6,433,664 B1 * 8/2002 Ishii et al. .................. 336/185
6,573,820 B2 * 6/2003 Yamada et al. ............. 336/184

* cited by examiner

*Primary Examiner*—Michael Colaianni
*Assistant Examiner*—Michael I. Poe
(74) *Attorney, Agent, or Firm*—Larry I. Golden

(57) ABSTRACT

A method of manufacturing an improved comb for a disk wound transformer. The method comprises the steps of providing a web of cellulose material; removing a portion of the cellulose material to create a plurality of longitudinal slits along the length of the web, wherein the longitudinal slits have a fixed length and width; and folding the web along a line proximate the midpoint of the length of each of the longitudinal slits such that the cellulose material adjacent the longitudinal slits defines a plurality of tooth members.

14 Claims, 5 Drawing Sheets

METHOD OF MANUFACTURING A COMB FOR WINDING COILS OF A DISK WOUND TRANSFORMER

DESCRIPTION

1. Technical Field

The present invention relates generally to electrical transformers and winding structures for the transformers. More particularly, the present invention relates to a comb used within the winding structures of transformers to maintain the integrity of the windings and the winding structures during and after the manufacturing process.

2. Background of the Invention

The transformer is a known electrical component which contains at least two electrical windings formed into a coil or coils mounted on a core of magnetic material by means of which AC electrical energy is coupled from one winding to the other, respectively termed the "primary" and the "secondary." Generally each of those windings are formed of a large number of turns of electrical enamel or paper covered wire fabricated in the form of a coil by means of conventional coil-winding machinery.

In the past, disk wound transformers have been manufactured using molded combs, cut combs, or use key spacers between winding segments. Each of these alternatives is typically expensive and require set-up procedures requiring time and labor.

The present invention is provided to solve these and other problems and to provide other advantages. Specifically, The present invention will provide, among other things, greater design flexibility, lower cost, a higher thermal rating on the comb and greater stability during the winding process. Preferred embodiments will be disclosed and the novel aspects of the present invention will be particularly identified and discussed herein.

SUMMARY OF THE INVENTION

It is an object of the present invention to provide a comb for a disk wound transformer and method for manufacturing the same.

According to one aspect of the present invention, a comb for winding coils of a disk wound transformer is disclosed. The comb comprises a first row comprising a plurality of first tooth members, wherein each first tooth member forms an apex proximate a respective midpoint of each of the respective first tooth members. The comb further comprises a second row comprising a plurality of second tooth members adjacent the row of first tooth members. Each second tooth member forms an apex proximate a respective midpoint of each of the respective second tooth members. The first and second rows of tooth members are formed from a single web of cellulose material.

According to another aspect of the present invention, a method for creating a comb is disclosed. The method comprises the steps of providing a web of cellulose material and removing a portion of the cellulose material to create a plurality of longitudinal slits along the length of the web, wherein the longitudinal slits have a fixed length and width. The method further comprises the step of folding the web along a line proximate the midpoint of the length of the longitudinal slits, wherein the cellulose material adjacent the longitudinal slits defines a plurality of tooth members for receiving transformer coil therebetween.

According to yet another aspect of the present invention, a method of winding coil on a transformer core is disclosed.

The method comprising the steps of providing a winding structure and providing a comb of the type described above; attaching the comb to the winding structure; and winding coil between the teeth of the comb.

According to another aspect of the present invention, a second embodiment of a comb for winding coils of a disk wound transformer is disclosed. The second embodiment comprises a plurality of first longitudinal members formed from cellulose material. Each of the plurality of first longitudinal members has either a male or female portion at its distal end. The comb also comprises a plurality of second longitudinal members formed from cellulose material. Each of the plurality of second longitudinal members has a male or female portion at its distal end. Each of the male portions of first and second longitudinal members is received by a corresponding female portion of the other longitudinal members such that an apex is formed by the distal ends of the first and second plurality of longitudinal members. Thus, a plurality of tooth members for receiving coil windings of a transformer is formed.

According to still another aspect of the present invention, a method of making the second embodiment of a comb for a disk wound transformer described above is disclosed.

Other features and advantages of the invention will be apparent from the following specification taken in conjunction with the following drawings.

BRIEF DESCRIPTION OF THE DRAWINGS

In order that the present invention may be more fully understood, it will now be described by way of example, with reference to the accompanying drawings in which.

DETAILED DESCRIPTION OF THE PREFERRED EMBODIMENT

Figure 1:
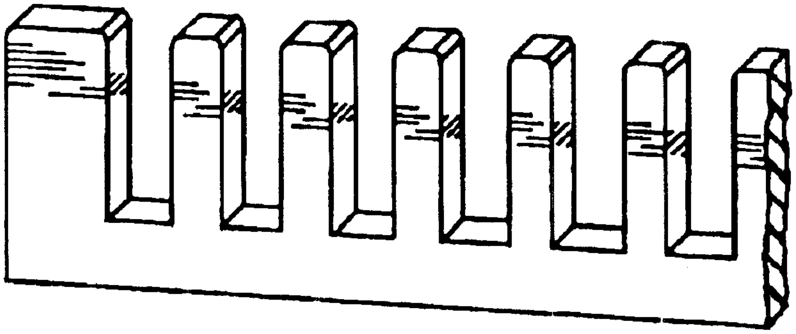
(PRIOR ART) Fig. 1
FIG. 1 is a partial perspective view of a prior art molded comb.
Figure 2:
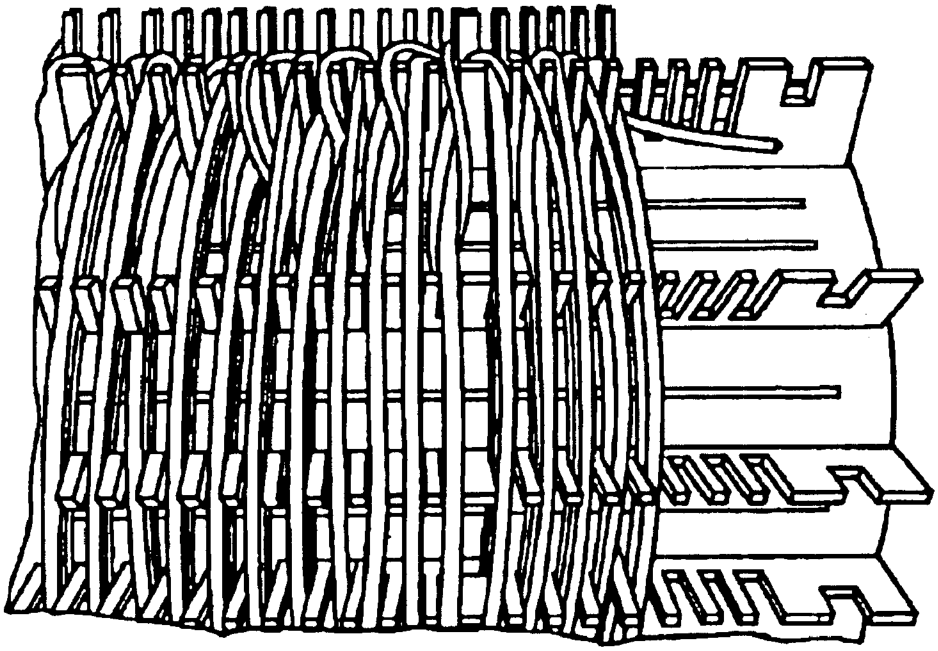
(PRIOR ART) Fig. 2
FIG. 2 is a perspective view of a prior art winding structure incorporating the prior art molded combs of FIG. 1.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 3:
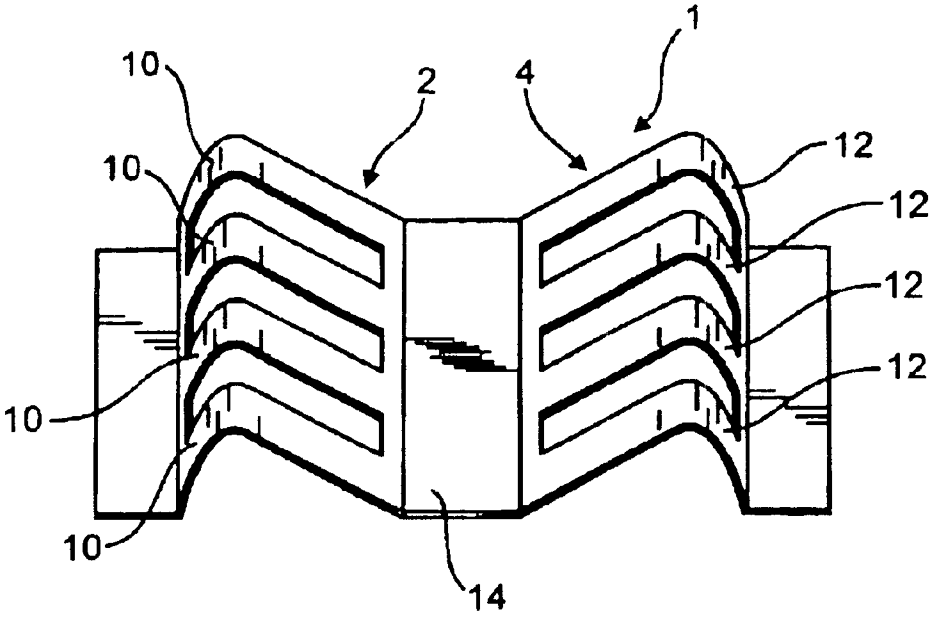
FIG. 3 is a partial front perspective view of a section of a comb of the present invention.
Figure 4:
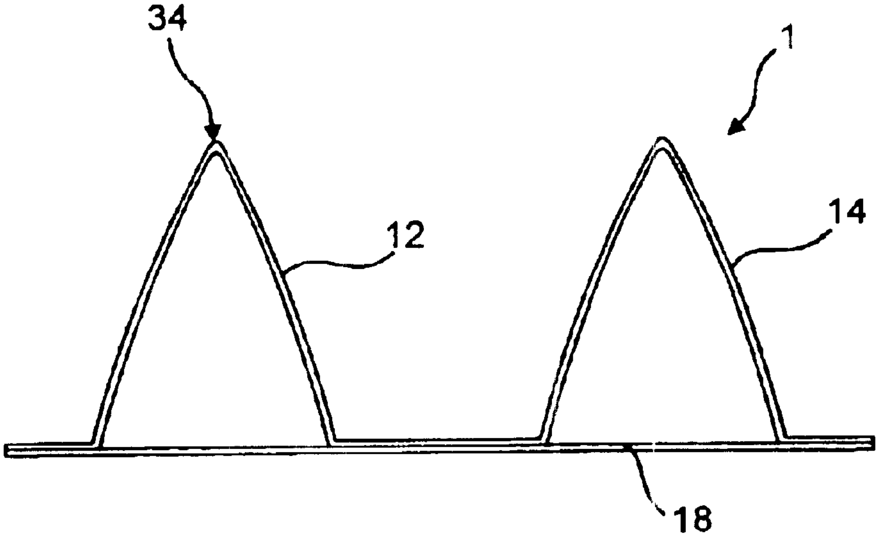
FIG. 4 is a front view of the comb of FIG. 3.
Figure 5:
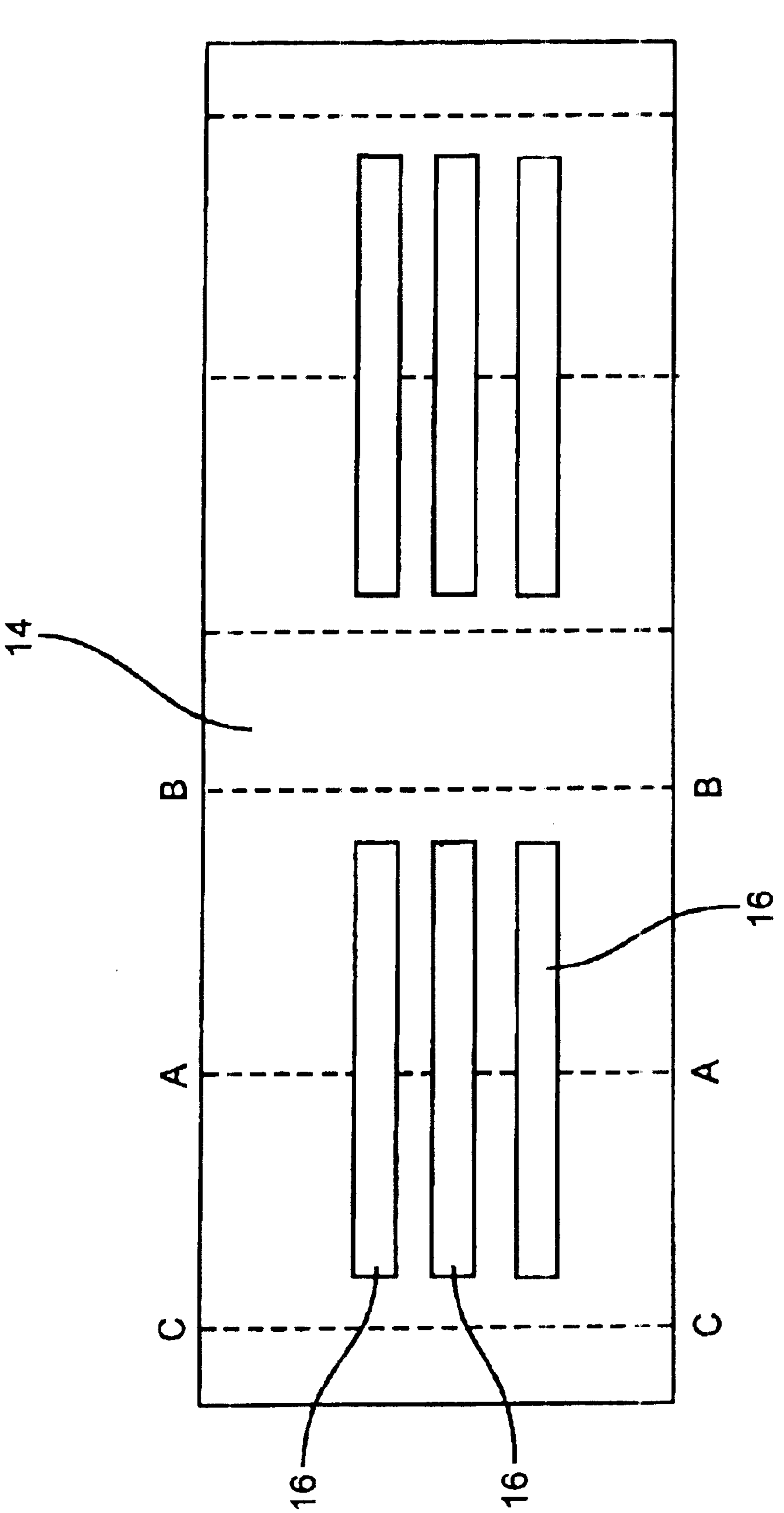
FIG. 5 is a top view of the comb of FIG. 3 after the holes have been punched out and the fold lines have been placed on the rigid paper.

With reference to FIGS. 3–5, illustrated are various views of a comb 1 for a disk wound transformer according to the present invention. The comb 1 comprises a first row 2 having a plurality of first tooth members 10, wherein each first tooth member 10 forms an apex 34 proximate a respective midpoint of each of the respective first tooth members 10. The comb 1 further comprises a second row 4 comprising a plurality of second tooth members 12 adjacent the first row 2 of first tooth members 10. Each second tooth member 12 forms an apex 34 proximate a respective midpoint of each of the respective second tooth members 12. The rows 2, 4 of first and second tooth members 10, 12 are formed from a single web 14 of cellulose material.

Specifically, the comb 1 is made from a web 14 of rigid paper material, preferably a high temperature paper, such as NOMEX sold by DuPont, or a thin, rigid material such as GLASTIC FHT sold by Glastic Co. The paper web 14 has a plurality of longitudinal slits 16 along its length. Each longitudinal slit 16 is approximately one-half inch wide and approximately six inches long, with an approximate one-half inch of web 14 between each longitudinal slit 16. However, it is known that the longitudinal slit 16 dimensions can vary depending upon the size and type of transformer with which the comb 1 is being employed.

A series of fold lines are impressed laterally across the paper web 14. The first fold line A—A is placed equidistant along the length of the row of longitudinal slits 16. The second fold line B—B is placed inward of the row of longitudinal slits 16, approximately five-eighths inch from the end of the longitudinal slit 16. The third fold line C—C is placed outward of the row of longitudinal slits 16, approximately five-eighths inch away from the opposed end of the each of the longitudinal slits 16. Where more than one row of longitudinal slits 16 is created in the paper web 14, the fold lines B—B and C—C are impressed approximately two inches apart. However, it is known that this dimension can vary according to the size and design of the transformer with which the comb is used. To complete production of the comb 1, the paper web 14 is folded along fold lines A—A, B—B and C—C.

The comb 1 of the present invention will preferably be manufactured using a steel rule die. The actual size and length of the comb 1 may vary, depending on several factors, including voltage rating. Likewise, the size of the web 14 of rigid paper material is determined by the such factors, as well as by the specific diameter of the coil (not shown) being wound. The number of rows of combs is typically a function of the coil diameter.

Figure 7:
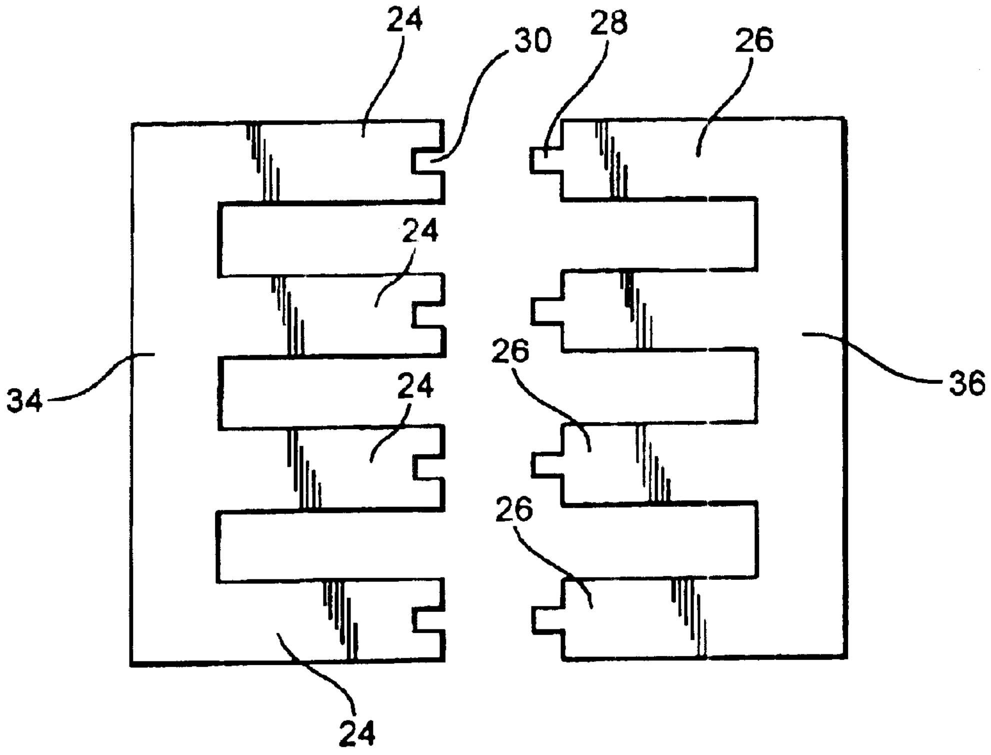
FIG. 7 is a top view of a second embodiment of a comb of the present invention; and, FIG. 8 is a partial perspective view of a section of the second embodiment of a comb of the present invention.
Figure 8:
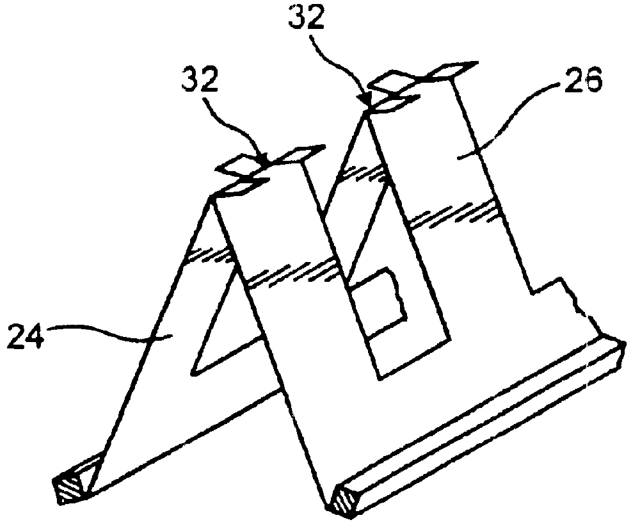

FIGS. 7 and 8 illustrate another embodiment of a comb 22 according to the present invention. Like the embodiment described above, the comb 22 illustrated in FIGS. 7 and 8 is made from a rigid paper material; preferably a high temperature paper, such as NOMEX or a thin, rigid material such as GLASTIC FHT. However, it is contemplated that the comb 22 be made from any rigid paper material capable of maintaining the integrity of coil windings and winding structures 18 during the winding of electrical transformers.

As shown in FIGS. 7 and 8, a first and second plurality of a longitudinal members 24, 26 is formed from cellulose material. Each of the longitudinal members comprising the first and second plurality of longitudinal members 24, 26 has either a male 28 or female 30 portion extending from a distal end. Each of the male 28 or female 30 portions of the first and second longitudinal members 24, 26 is received by a corresponding male 28 or female 30 portion of the other of the first and second longitudinal members 24, 26 such that an apex 32 is formed by the distal ends of the first and second longitudinal members 24, 26. Accordingly, a plurality of tooth members for receiving coil windings of a transformer is formed.

In manufacturing the comb 22 illustrated in FIGS. 7 and 8, material is removed from first and second webs of cellulose 34, 36 such that the first and second plurality of longitudinal members 24, 26, including their respective male 28 and female 30 portions, are defined. The respective male 28 and female 30 portions of the longitudinal members 24, 26 are then interlocked and the webs 34, 36 are folded at a distance from the distal end of the length of the first and second plurality of longitudinal members 24, 26 such that an apex 32 is formed by the distal ends of the first and second plurality of longitudinal members 24, 26. Accordingly, a plurality of tooth members of the comb 22 is defined.

Figure 6:
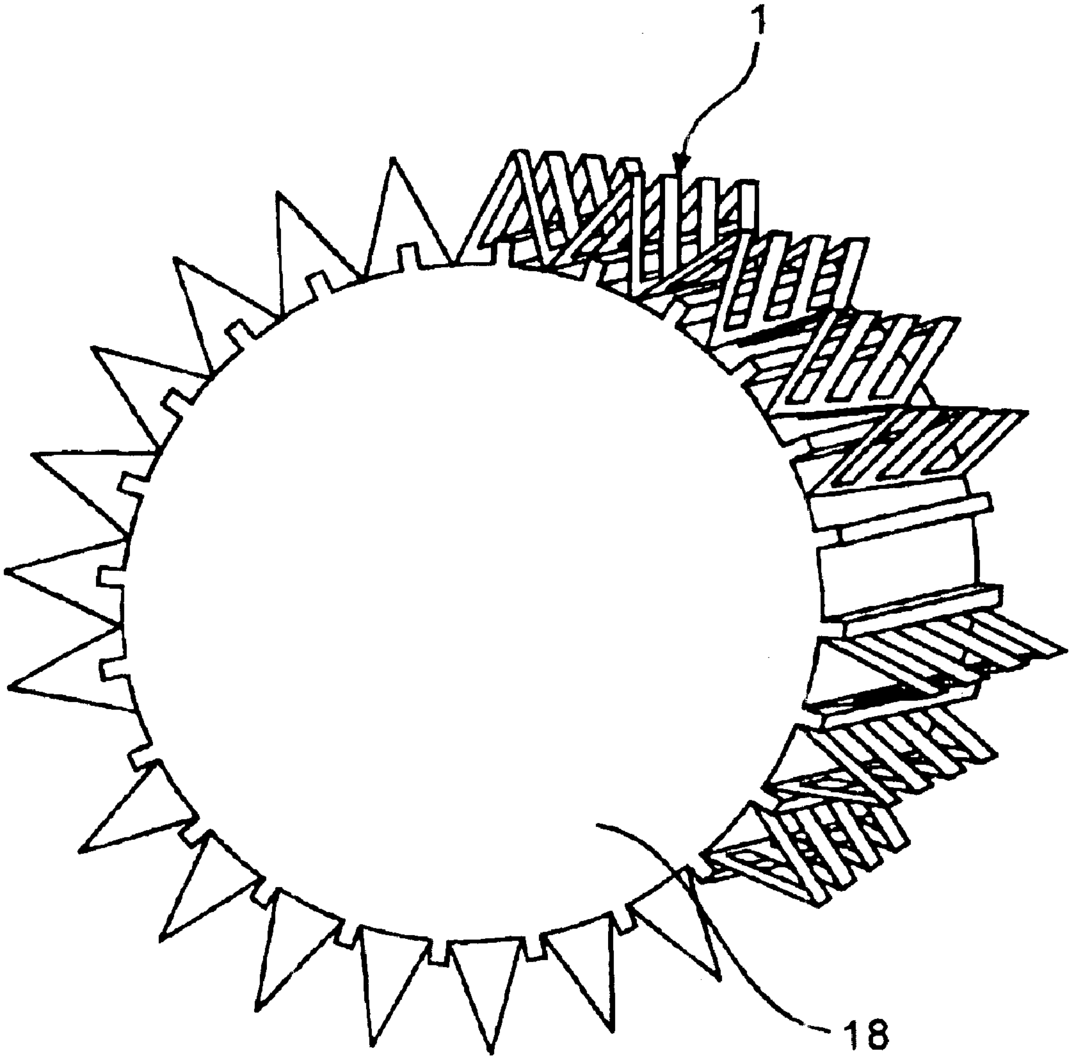
FIG. 6 is a perspective view of the present invention in a continuous folded piece encircling a disk wound transformer structure.

Either of the combs 1, 22 described above may be affixed to the inner winding in a number of different ways. As seen in FIG. 6, one preferred method of assembly is to place individual combs 1, 22 between longitudinally placed rods secured to the inner winding. These rods also serve the function of providing the proper radial space between the high voltage and low voltage windings. This method allows fewer combs 1, 22 to be used if placed between every other set of rods. Generally, the combs 1, 22 described herein are suitable for use in transformers having voltage ratings of between 75 kVA and 750 kVA. However, it is contemplated that these combs 1, 22 are suitable for use with any size transformer.

Another preferred method of assembly illustrated in FIG. 6 is to continuously fold the combs 1, 22 (as in an accordion or bellows) into a stack and then fan them over the perimeter of the inner winding. This allows for rapid placement of the comb, which is an advantage over the previously disclosed method.

While the specific embodiments have been illustrated and described, numerous modifications come to mind without significantly departing from the spirit of the invention and the scope of protection is only limited by the scope of the accompanying claims.

I claim:

1. A method of manufacturing a comb for winding coils of a disk wound transformer comprising the steps of:

providing a web of cellulose material;

removing a portion of the cellulose material to create a plurality of longitudinal slits along the length of the web, the longitudinal slits having a fixed length and width; and, folding the web laterally along a line proximate the midpoint of the length of the longitudinal slits, wherein the cellulose material adjacent the longitudinal slits defines a plurality of tooth members for receiving transformer coil therebetween.

2. The method of claim 1 further comprising the step of scoring the cellulose material such that predetermined fold lines are formed in the cellulose material.

3. The method of claim 1 further comprising the step of folding the web laterally along a line a distance inward of the longitudinal slit.

4. The method of claim 1 further comprising the step of folding the web laterally along a line a distance outward of the longitudinal slit.

5. The method of claim 1 further comprising the steps of removing a plurality of portions of cellulose material to create a plurality of rows of longitudinal slits, each row extending along the width of the web material and having a predetermined length and width.

6. The method of claim 5 further comprising the step of folding the web laterally along a line a distance inward of the plurality of rows of longitudinal slits.

7. The method of claim 5 further comprising the step of folding the web laterally along a line a distance outward of the plurality of rows of longitudinal slits.

8. The method of claim 1 further comprising the step of removing a plurality of portions of the cellulose material to create a row of longitudinal slits in the web material, the row of longitudinal slits having a fixed length and width.

9. The method of claim 8 further comprising the step of folding the web laterally along a line a distance inward of the row of longitudinal slits.

10. The method of claim 9 further comprising the step of folding the web laterally along a line a distance inward of first and second adjacent rows of longitudinal slits.

11. The method of claim 8 further comprising the step of folding the web laterally along a line a distance outward of the row of longitudinal slits.

12. The method of claim 11 further comprising the step of folding the web laterally along a line a distance outward of first and second adjacent rows of longitudinal slits.

13. A method of manufacturing a comb for a disk wound transformer comprising the steps of:

providing a first web of cellulose material;

providing a second web of cellulose material;

removing material from the first web such that a first plurality of longitudinal members are defined therein, wherein each of the first plurality of longitudinal members has one of either an extending male portion or a recessed female portion at its distal end;

removing material from the second web such that a second plurality of longitudinal members are defined, wherein each of the second plurality of longitudinal members has the other of an extending male portion or a recessed female portion at its distal end;

interlocking the male portions of the first or second plurality of longitudinal members with corresponding female portions of the first or second plurality of longitudinal members; and, folding the web laterally at a distance from the distal ends of the first and second plurality of longitudinal members such that an apex is formed by the distal ends of the first and second plurality of longitudinal members and a plurality of tooth members of the comb are defined.

14. The method of claim 13 further comprising the step of scoring the cellulose material such that predetermined fold lines are formed in the cellulose material.

* * * * *